US005688424A

United States Patent [19]

Asida

[11] Patent Number: 5,688,424

[45] Date of Patent: Nov. 18, 1997

[54] PTC THERMISTOR

[75] Inventor: Shyoji Asida, Nagaokakyo, Japan

[73] Assignee: Murata Manufacturing Co., Ltd., Japan

[21] Appl. No.: 605,707

[22] Filed: Feb. 23, 1996

Related U.S. Application Data

[63] Continuation of Ser. No. 216,033, Mar. 22, 1994.

[30] Foreign Application Priority Data

Mar. 12, 1949 [JP] Japan .................................... 5-064480

[51] Int. Cl.[6] .............................. H05B 3/06; H01C 7/10; H02H 5/04

[52] U.S. Cl. .......................... 219/531; 338/22 R; 361/25

[58] Field of Search ................................ 361/23, 24, 25, 361/27

[56] References Cited

U.S. PATENT DOCUMENTS

| | | | |
|---|---|---|---|
| 3,584,189 | 6/1971 | Marcoux et al. | 219/209 |
| 3,835,434 | 9/1974 | Kahn | 29/613 |
| 3,996,447 | 12/1976 | Bouffard et al. | 219/541 |
| 4,164,000 | 8/1979 | Woods | 361/27 |
| 4,241,494 | 12/1980 | Woods | 29/619 |
| 4,493,144 | 1/1985 | Woods et al. | 29/622 |
| 4,786,888 | 11/1988 | Yondeda et al. | 338/22 R |
| 5,162,634 | 11/1992 | Kusaka | 219/546 |

*Primary Examiner*—Teresa J. Walberg
*Assistant Examiner*—Sam Paik
*Attorney, Agent, or Firm*—Ostrolenk, Faber, Gerb & Soffen, LLP

[57] ABSTRACT

A PTC thermistor comprising a ceramic body having positive temperature coefficient resistivity, a pair of electrode layers provided on both major surfaces of the ceramic body so as to be opposed to each other with the ceramic body interposed therebetween, a pair of metal terminals electrically connected to the electrode layers, and a resin molded portion provided so as to cover side surfaces of the ceramic body and side surfaces of the electrode layers, the metal terminal having a connecting plate electrically connected to the electrode layer and a terminal plate opposed to the connecting plate so that a space is formed between the terminal plate and the connecting plate and connected to the connecting plate by a linking portion, and the resin molded portion being so formed as to expose an outer side surface of the terminal plate of the metal terminal and fill the space between the connecting plate and the terminal plate of the metal terminal.

11 Claims, 5 Drawing Sheets

PTC THERMISTOR

This is a continuation of application Ser. No. 08/216,033 filed on Mar. 22, 1994.

BACKGROUND OF THE INVENTION

1. Field of the Invention

The present invention relates generally to a PTC thermistor, and more particularly, to a PTC thermistor for use in a DC motor or the like and to be used for the purpose of, for example, prevention of overcurrent.

2. Description of the Related Art

FIG. 10 is a perspective view showing a conventional PTC thermistor. Referring to FIG. 10, electrode layers 34 are provided on both major surfaces of a ceramic body 33 having positive temperature coefficient resistivity. A terminal 36 made of a metal is provided on the electrode layer 34 through a conductive adhesive layer 35 composed of conductive adhesives. Copper, brass or the like having good heat dissipation properties, and conductive properties, is generally used as the metal terminal 36. Such a metal terminal 36 also performs the function of reinforcing the ceramic body 33. In addition, such a metal terminal 36 gives the effect of increasing the volume of the entire PTC thermistor 32 to extend operating time.

The PTC thermistor self-heats so that its resistance value is increased by the positive temperature coefficient resistivity of ceramic body 33 when an overcurrent exceeding a predetermined current value flows due to any abnormality, thereby to so operate that the flowing current is kept below the predetermined current value. Such a PTC thermistor is incorporated in a DC motor for the purpose of, for example, protection against an overcurrent in the DC motor. FIG. 8 is a perspective view showing such a DC motor 25. FIG. 9 is a cross-sectional view taken along a line A—A shown in FIG. 8. Referring to FIGS. 8 and 9, brushes 28 for supplying power to a commutator 27 of an electrode (not shown) are supported on respective ends of conductive inner terminals 29 and 30 inside DC motor 25. The PTC thermistor 32 is interposed between the other end of the inner terminal 30 and another inner terminal 31. The inner terminals 29, 30 and 31 are mounted on a motor case 26.

The PTC thermistor shown in FIG. 10 is used, as one of its applications, for preventing an overcurrent from flowing in the DC motor as shown in FIG. 9.

With respect to the PTC thermistor used inside the DC motor, it is desired to miniaturize the PTC thermistor with respect to an internal space of the motor. Further, it is desired to reduce the resistance of the PTC thermistor so as to reduce power loss caused by a voltage drop across the thermistor. Consequently, the PTC thermistor is made thin (approximately 0.1 to 1 mm).

In the conventional PTC thermistor, the side surfaces of the electrode layers 34 and the metal terminals 36 are exposed, as shown in FIG. 10. Therefore, lubricating grease sealed in the motor case of the DC motor may, in some cases, adhere to side surfaces of the PTC thermistor. In such a case, the withstand voltage of the PTC thermistor is decreased and consequently, an abnormal current flows, so that there is a danger of damaging the PTC thermistor.

As described in the foregoing, the PTC thermistor is made thin so as to reduce the size and the resistance thereof. Therefore, it is possible for a conductive component such as silver contained in the electrode layers 34 and the conductive adhesive layers 35 to migrate, so that a short circuit develops between the electrode layers 34. As a result, an abnormal current flows, so that there is a danger of damaging the PTC thermistor.

Furthermore, the spacing between the metal terminals 36 in the PTC thermistor is close. If conductive foreign matter adheres to the area between the metal terminals 36, therefore, a short circuit develops between the metal terminals 36. As a result, inherent functions of the PTC thermistor element such as to restrain an overcurrent, cannot, in some cases, be exhibited.

SUMMARY OF THE INVENTION

The present invention provides a PTC thermistor capable of preventing the decrease in withstand voltage, the occurrence of a short-circuit accident, and damage of the PTC thermistor and equipment connected thereto due to an abnormal current.

The PTC thermistor according to the present invention comprises a ceramic body having positive temperature coefficient resistivity, a pair of electrode layers provided on both major surfaces of the ceramic body so as to be opposed to each other with the ceramic body interposed therebetween, a pair of metal terminals electrically connected to the electrode layers, and a resin molded portion provided so as to cover side surfaces of the ceramic body and side surfaces of the electrode layers. The metal terminal has a connecting plate electrically connected to the electrode layer, and a terminal plate opposed to the connecting plate, so that a space is formed between the terminal plate and the connecting plate and connected to the connecting plate by a linking portion. The resin molded portion is so formed as to expose outer contact surfaces of the terminal plate of the metal terminal and fill the space between the connecting plate and the terminal plate of the metal terminal.

According to the present invention, the side surfaces of the ceramic body and the side surfaces of the electrode layers are covered with the resin molded portion. Accordingly, it is possible to prevent the decrease in the withstand voltage due to the adhesion of grease or the like to the side surfaces of the ceramic body. The side surfaces of the ceramic body and the side surfaces of the electrode layers are sealed by the resin molded portion, so that the ceramic body and the electrode layers are shut off from air and consequently, are less susceptible to moisture in the air. Further, the side surfaces of the ceramic body and the side surfaces of the electrode layers are covered with the resin molded portion, so that a conductive component such as silver contained in the electrode layers does not easily migrate.

According to a first aspect of the present invention, a fuse portion having a narrowed width is provided between the connecting plate and the terminal plate of the metal terminal. Even if an abnormal current flows through the PTC thermistor, the current can be interrupted before the PTC thermistor is damaged by providing such a fuse portion.

According to a second aspect of the present invention, the ceramic body is interposed between outer side surfaces of the connecting plates of the pair of metal terminals, and is electrically connected to the electrode layers on the outer side surfaces.

According to a third aspect of the present invention, the ceramic body is disposed in both spaces within the pair of metal terminals, is interposed between inner side surfaces of the connecting plates of the pair of metal terminals, and is electrically connected to the electrode layers on the inner side surfaces.

According to a fourth aspect of the present invention, the linking portion of the metal terminal is covered with the resin molded portion. The linking portion of the metal terminal is thus covered with the resin molded portion, thereby making it possible to prevent more reliably a short circuit between the metal terminals more reliably.

Even if conductive foreign matter adheres to the side surfaces of the ceramic body, therefore, a short circuit does not easily develop between the metal terminals.

In the PTC thermistor according to the present invention, the resin molded portion is provided. Accordingly, the PTC thermistor is mechanically reinforced by the resin molded portion. Consequently, it is possible to use a thinner ceramic body.

Additionally, in the PTC thermistor according to the present invention, there is provided the metal terminal connected to the electrode layer, and the outer side surface of the terminal plate of the metal terminal is exposed. Therefore, it is possible to efficiently dissipate heat generated by the PTC thermistor through the metal terminal.

The foregoing and other objects, features, aspects and advantages of the present invention will become more apparent from the following detailed description of embodiments of the present invention when taken in conjunction with the accompanying drawings.

DESCRIPTION OF THE PREFERRED EMBODIMENTS

Figure 1:
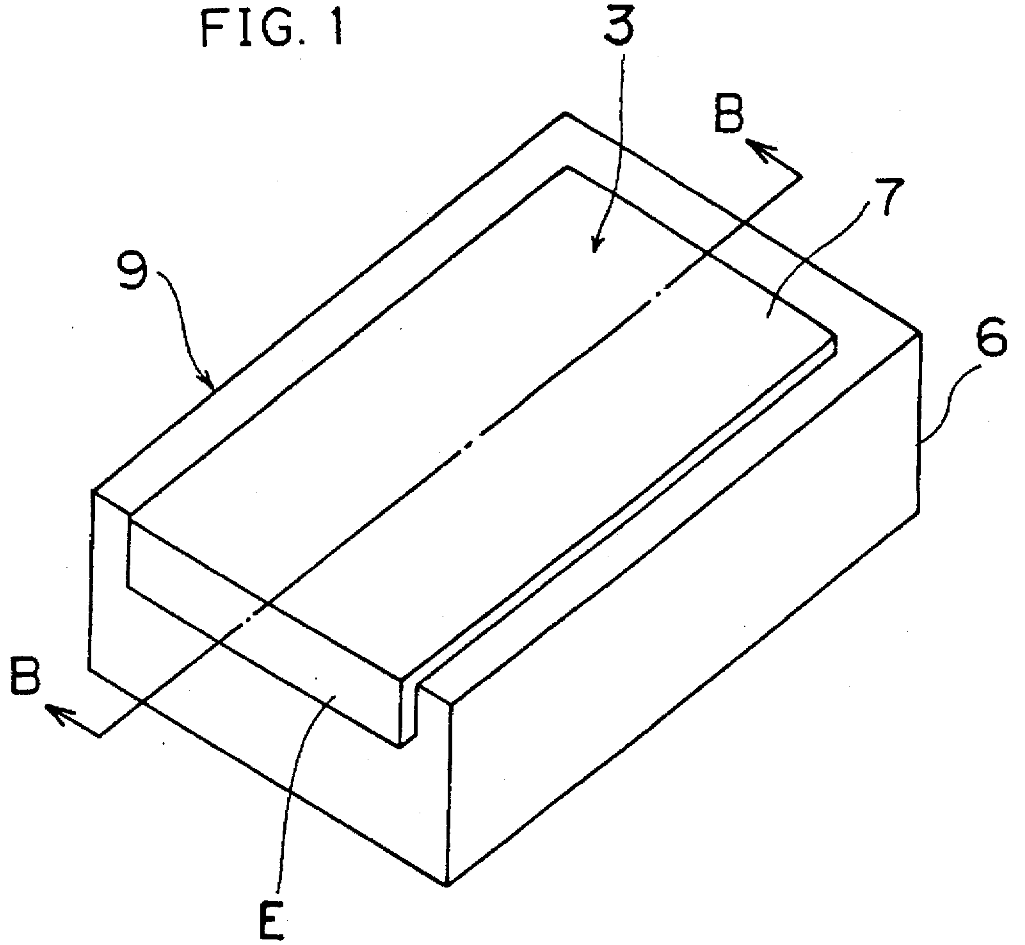
FIG. 1 is a perspective view showing a PTC thermistor according to a first embodiment of the present invention.
Figure 2:
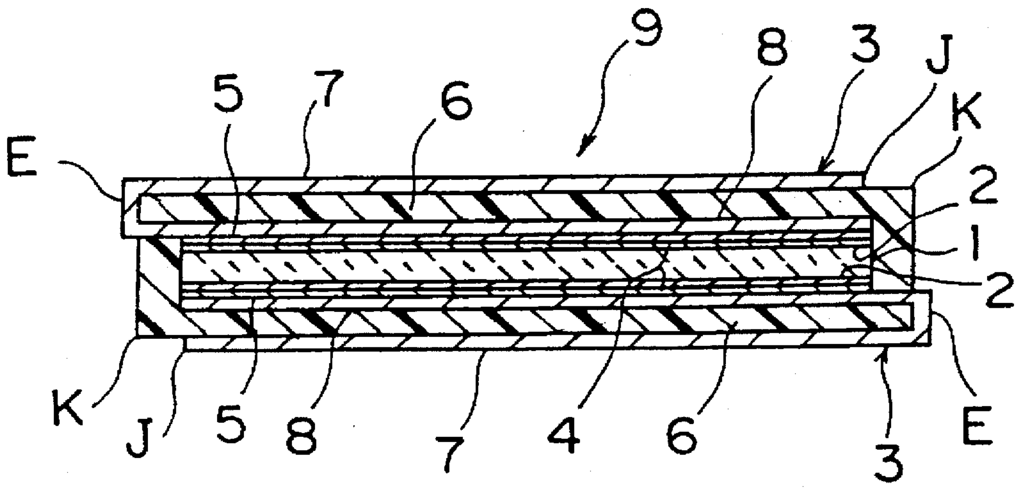
FIG. 2 is a cross sectional view taken along a line B—B shown in FIG. 1.

FIG. 1 is a perspective view showing a PTC thermistor according to a first embodiment of the present invention. FIG. 2 is a cross sectional view taken along a line B—B shown in FIG. 1. Referring to FIG. 1, a PTC thermistor 9 has such an appearance that an outer side surface of a terminal plate 7 of a metal terminal 3 is exposed from a resin molded portion 6. An outer side surface of a terminal plate of a metal terminal is also exposed on a lower surface of the PTC thermistor element 9, which is not illustrated in FIG. 1.

Referring to FIG. 2, electrode layers 2 are respectively formed on both opposing major surfaces of a ceramic body 1. The ceramic body 1 is composed of ceramic having positive temperature coefficient resistivity. In the present embodiment, ceramic prepared by mixing trace amounts of oxides such as lanthanum, yttrium, bismuth and thorium with barium titanate is used as the ceramic body 1. The electrode layer 2 is an ohmic contact electrode and is formed by applying a conductive paste mainly composed of silver or the like and then, baking the same. A connecting plate 5 of the metal terminal 3 is provided on the electrode layer 2 through a conductive material layer 4 composed of conductive adhesives, solder or the like. The metal terminal 3 is constituted by a connecting plate 5, a terminal plate 7 and a linking portion E for linking the connecting plate 5 and the terminal plate 7. The connecting plate 5 is electrically connected to the electrode layer 2 through the conductive material layer 4.

Figure 9:
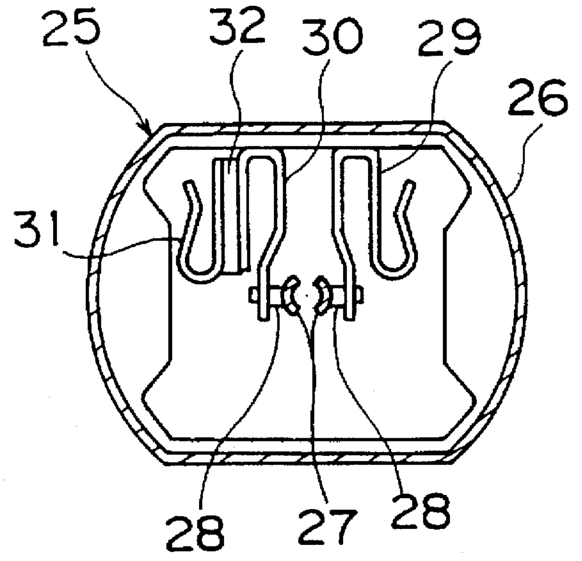
FIG. 9 is a cross-sectional view taken along a line A—A shown in FIG. 8.
Figure 10:
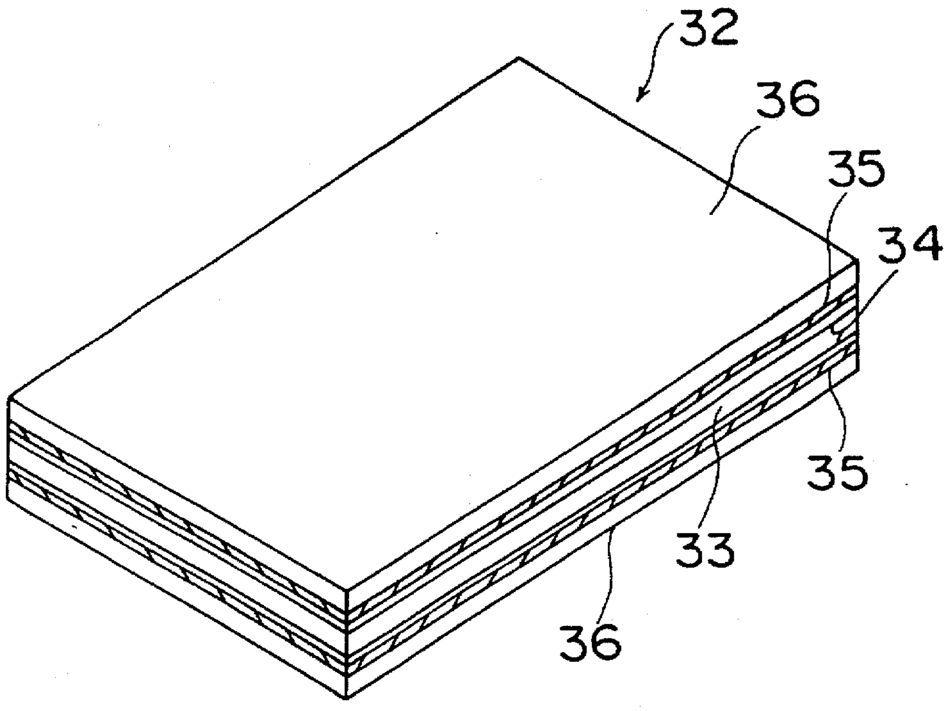
FIG. 10 PRIOR ART
FIG. 10 is a perspective view showing a conventional PTC thermistor.

A resin molded portion 6 covers side surfaces of the ceramic body 1 and the electrode layers 2, and is so formed as to fill a space between the terminal plate 7 and the connecting plate 5 of the metal terminal 3. The resin molded portion 6 can be composed of heat-resistant resin such as polyphenylene sulfide (PPS) or a liquid crystal polymer. In the present embodiment, the resin molded portion 6 is so formed that the terminal plate 7 and the linking portion E of the metal terminal 3 are exposed, as shown in FIG. 1. Since the terminal plates 7 are thus exposed to both major surfaces of the PTC thermistor 9, the PTC thermistor 9 can be interposed and held by terminals 30 and 31 in the motor 25 as shown in FIG. 9. As a material of the metal terminal 3, copper, brass or the like can be used in consideration with heat dissipation properties.

Figure 3:
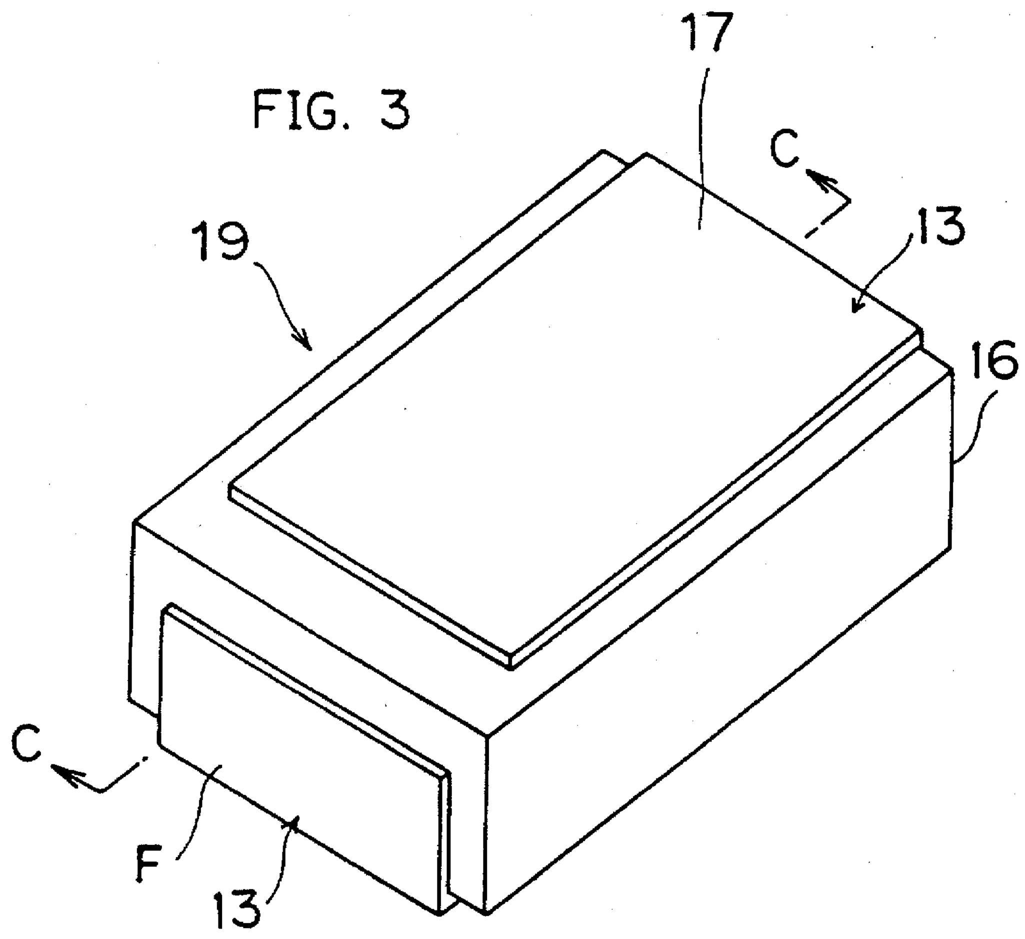
FIG. 3 is a perspective view showing a PTC thermistor according to a second embodiment of the present invention.
Figure 4:
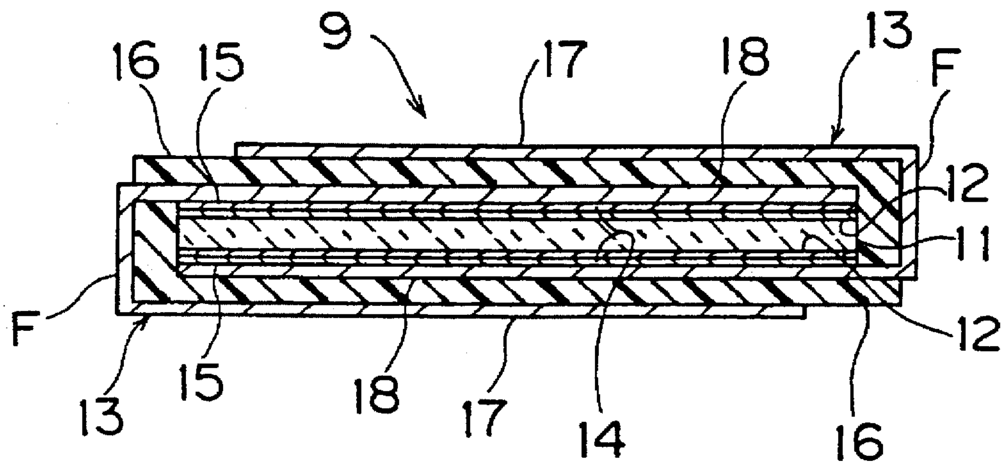
FIG. 4 is a cross-sectional view taken along a line C—C shown in FIG. 3.

FIG. 3 is a perspective view showing a second embodiment of the present invention. FIG. 4 is a cross-sectional view taken along a line C—C shown in FIG. 3. Referring to FIGS. 3 and 4, a PTC thermistor 19 according to the present embodiment has such an appearance that a terminal plate 17 and a linking portion F of a metal terminal 13 are exposed from a resin molded portion 16. As in the first embodiment, electrode layers 12 are formed on both major surfaces of a ceramic body 11. A conductive material layer 14 composed of conductive adhesives, solder or the like is formed on the electrode layer 12. The electrode layer 12 is electrically connected to an inner side surface of a connecting plate 18 of the metal terminal 13 through the conductive material layer 14. Consequently, the ceramic body 11 is disposed in a space between the connecting plate 18 and the terminal plate 17 of the metal terminal 13. A resin molded portion 16 is so formed as to cover side surfaces of the ceramic body 11 and the electrode layers 12 and fill a space between the terminal plate 17 and the connecting plate 18. In addition, the resin molded portion 16 is so formed as to expose the terminal plate 17 and the linking portion F of the metal terminal 13.

In the present embodiment, the PTC thermistor 19 is so constructed that the connecting plate 18 is electrically connected to the electrode layer 12 on the major surface of the ceramic body 11 which is spaced apart from the terminal plate 17.

Figure 5:
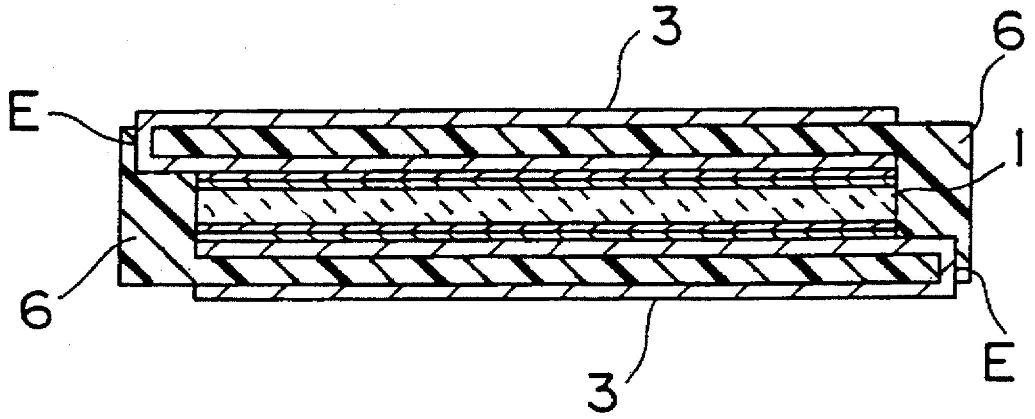
FIG. 5 is a cross-sectional view showing a PTC thermistor according to a third embodiment of the present invention.

FIG. 5 is a cross-sectional view showing a PTC thermistor according to a third embodiment of the present invention. In the present embodiment, a metal terminal 3 and a ceramic body 1 are constructed in the same positional relationship as that in the embodiment shown in FIG. 2. In the present embodiment, a linking portion E of the metal terminal 3 is covered with a resin molded portion 6. The connecting portion E is thus covered with the resin molded portion 6, thereby making it possible to prevent more reliably a short circuit accident due to the adhesion of conductive foreign matter.

Figure 6:
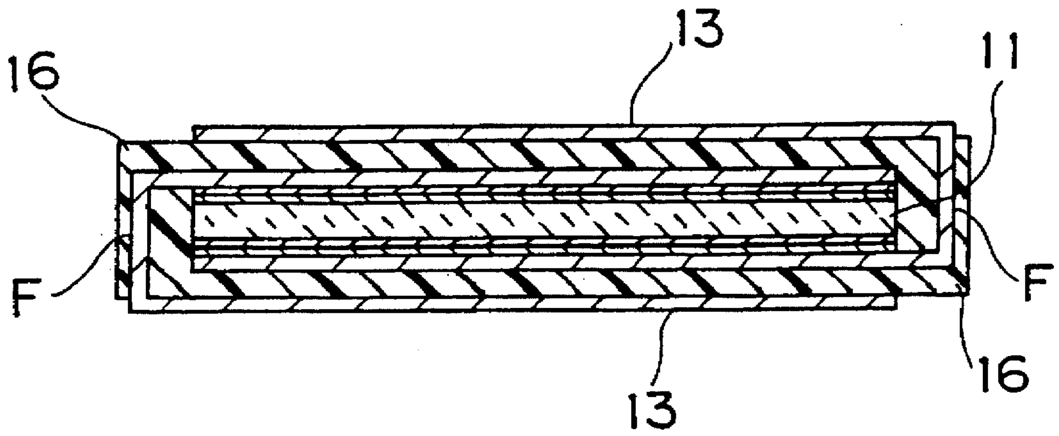
FIG. 6 is a cross-sectional view showing a PTC thermistor according to a fourth embodiment of the present invention.

FIG. 6 is a cross-sectional view showing a PTC thermistor according to a fourth embodiment of the present invention. In the present embodiment, the positional relationship between a ceramic body 11 and a metal terminal 13 is the same as that in the embodiment shown in FIG. 4. In the present embodiment, a linking portion F of the metal terminal 13 is covered with a resin molded portion 16. The linking portion F of the metal terminal 13 is thus covered with the resin molded portion 16, thereby making it possible to prevent more reliably a short circuit accident due to the adhesion of conductive foreign manner.

Figure 7:
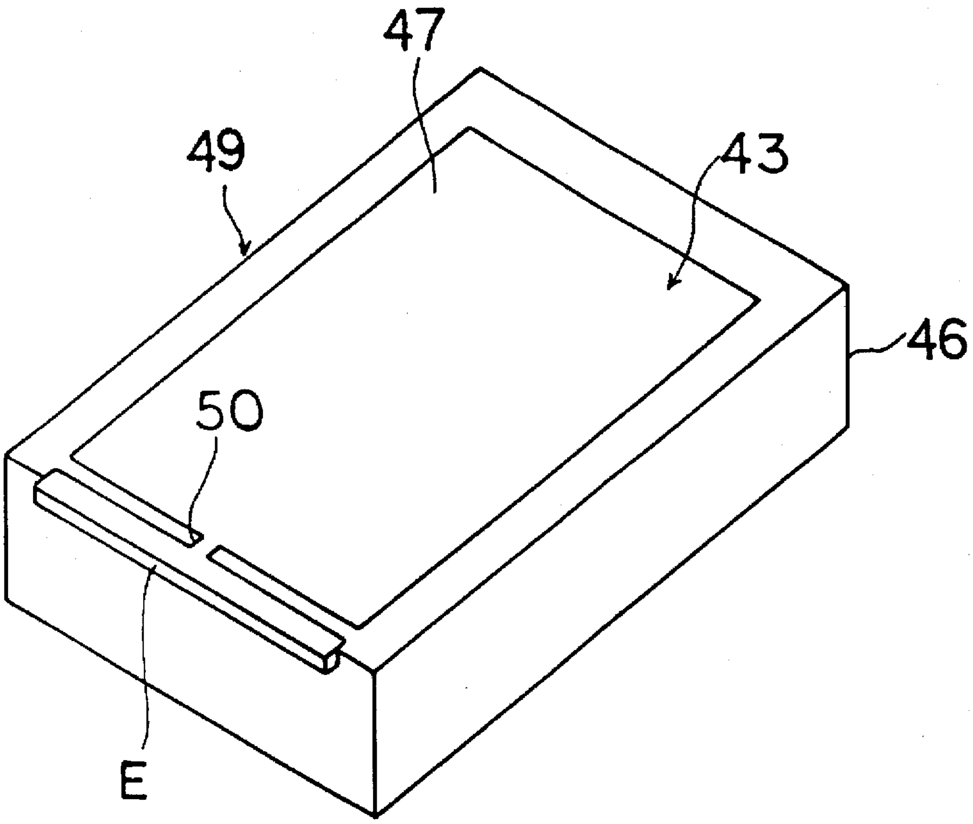
FIG. 7 is a perspective view showing a PTC thermistor according to a fifth embodiment of the present invention.
Figure 8:
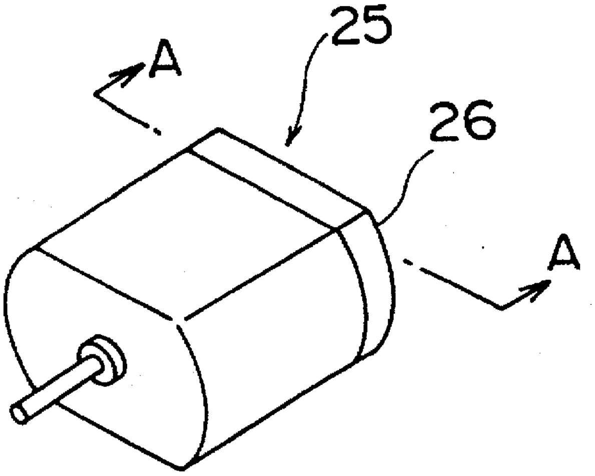
FIG. 8 is a perspective view showing one example of a DC motor using a PTC thermistor.

FIG. 7 is a perspective view showing a fifth embodiment of the present invention. Referring to FIG. 7, a PTC thermistor 49 according to the present embodiment has such an appearance that a terminal plate 47 and a linking portion E of a metal terminal 43 are exposed from a resin molded portion 46. In the present embodiment, a thin fuse portion 50 is formed between the terminal plate 47 and the linking portion E. Even if an abnormal current flows through the PTC thermistor 49, therefore, the formed fuse portion 50 is cut off by heat, thereby making it possible to protect the PTC thermistor 49 and equipment connected to the PTC thermistor 49. The position where the fuse portion 50 is formed is not limited to the position as shown in FIG. 7. The fuse portion 50 may be formed in any position between a connecting plate and a portion of a terminal plate in contact with an outer terminal.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A PTC thermistor comprising:

a ceramic body having two opposing major surfaces, two opposing side surfaces, and positive temperature coefficient resistivity;

a pair of electrode layers, each of said electrode layers having side surfaces, said electrode layers being provided on both major surfaces of the ceramic body, respectively, so as to be opposed to each other with said ceramic body interposed therebetween;

a pair of metal terminals each having:

a connecting plate having an inner surface and an outer surface, said connecting plate being electrically connected to a respective one of said electrode layers over substantially an entire surface of said respective electrode layer;

a terminal plate having opposed ends, said terminal plate being opposed to and spaced apart from said connecting plate so that an inner space is formed between said terminal plate and said inner surface of said connecting plate, said terminal plate having an inner surface and an outer contact surface opposed to said inner surface; and a linking portion electrically connecting said connecting plate and said terminal plate, said connecting plate, said terminal plate and said linking portion being integrally formed; and a resin molded portion provided for integrating said connecting plates and said ceramic body, said resin molded portion being formed so as to: expose said outer contact surface of said terminal plate of each of said metal terminals; fill completely said inner space between said connecting plate and said terminal plate of each of said metal terminals; cover and come into contact with said side surfaces of said ceramic body and corresponding said side surfaces of said electrode layers without spacing therebetween; and have end surfaces which extend outwardly of at least one of said ends of each terminal plate.

2. The PTC thermistor according to claim 1, wherein said ceramic body is interposed between said outer surfaces of said connecting plates of said pair of metal terminals, and is electrically connected to said electrode layers on said outer surfaces.

3. The PTC thermistor according to claim 1, wherein said ceramic body is disposed in said inner spaces of said pair of metal terminals, is interposed between said inner surfaces of said connecting plates of said pair of metal terminals, and said connecting plates are electrically connected to said electrode layers on said inner surfaces.

4. The PTC thermistor according to claim 1, wherein said linking portion of said metal terminal is covered with said resin molded portion.

5. The PTC thermistor according to claim 1, wherein, on each of said metal terminals, said connecting plate and said terminal plate are substantially parallel to one another.

6. The PTC thermistor according to claim 1, wherein said resin molded portion is composed of polyphenylene sulfide.

7. The PTC thermistor according to claim 1, wherein said resin molded portion is composed of a liquid crystal polymer.

8. The PTC thermistor according to claim 2, wherein said linking portion of said metal terminal is covered with said resin molded portion.

9. The PTC thermistor according to claim 3, wherein said linking portion of said metal terminal is covered with said resin molded portion.

10. A PTC thermistor comprising:

a ceramic body having two opposing major surfaces, two opposing side surfaces, and positive temperature coefficient resistivity;

a pair of electrode layers, each of said electrode layers having side surfaces, said electrode layers being provided on both major surfaces of the ceramic body, respectively, so as to be opposed to each other with said ceramic body interposed therebetween;

a pair of metal terminals each having:

a connecting plate having an inner surface and an outer surface, said connecting plate being electrically connected to a respective one of said electrode layers over substantially an entire surface of said respective electrode layer;

a terminal plate opposed to and spaced apart from said connecting plate so that an inner space is formed between said terminal plate and said inner surface of said connecting plate, said terminal plate having an inner surface and an outer contact surface opposed to said inner surface; and a linking portion electrically connecting said connecting plate and said terminal plate; and a resin molded portion provided for integrating said connecting plates and said ceramic body, said resin molded portion being formed so as to: expose said outer contact surface of said terminal plate of each of said metal terminals; fill completely said inner space between said connecting plate and said terminal plate of each of said metal terminals; and cover and come into contact with said side surfaces of said ceramic body and corresponding said side surfaces of said electrode layers without spacing therebetween, wherein at least one of said pair of metal terminals further includes a fuse portion between said terminal plate and said connecting plate, respectively, said fuse portion having a narrowed dimension with respect to a corresponding dimension of said connecting plate.

11. The PTC thermistor according to claim 10, wherein said fuse portion is provided between said terminal plate and said linking portion.

* * * * *

UNITED STATES PATENT AND TRADEMARK OFFICE

CERTIFICATE OF CORRECTION

PATENT NO. : 5,688,424

DATED : November 18, 1997

INVENTOR(S) : Shyoji ASIDA

It is certified that error appears in the above-indentified patent and that said Letters Patent is hereby corrected as shown below:

On the title page of the above-identified patent, at item [30], change the Foreign Application Priority Data from "Mar. 12, 1949" to --Mar. 24, 1993--.

Signed and Sealed this

Twenty-fifth Day of May, 1999

Attest:

Q. TODD DICKINSON

*Attesting Officer*

*Acting Commissioner of Patents and Trademarks*